May 3, 1927.
W. L. NEWMEYER
1,626,688
AUTOMATIC STATION
Filed Feb. 18, 1924
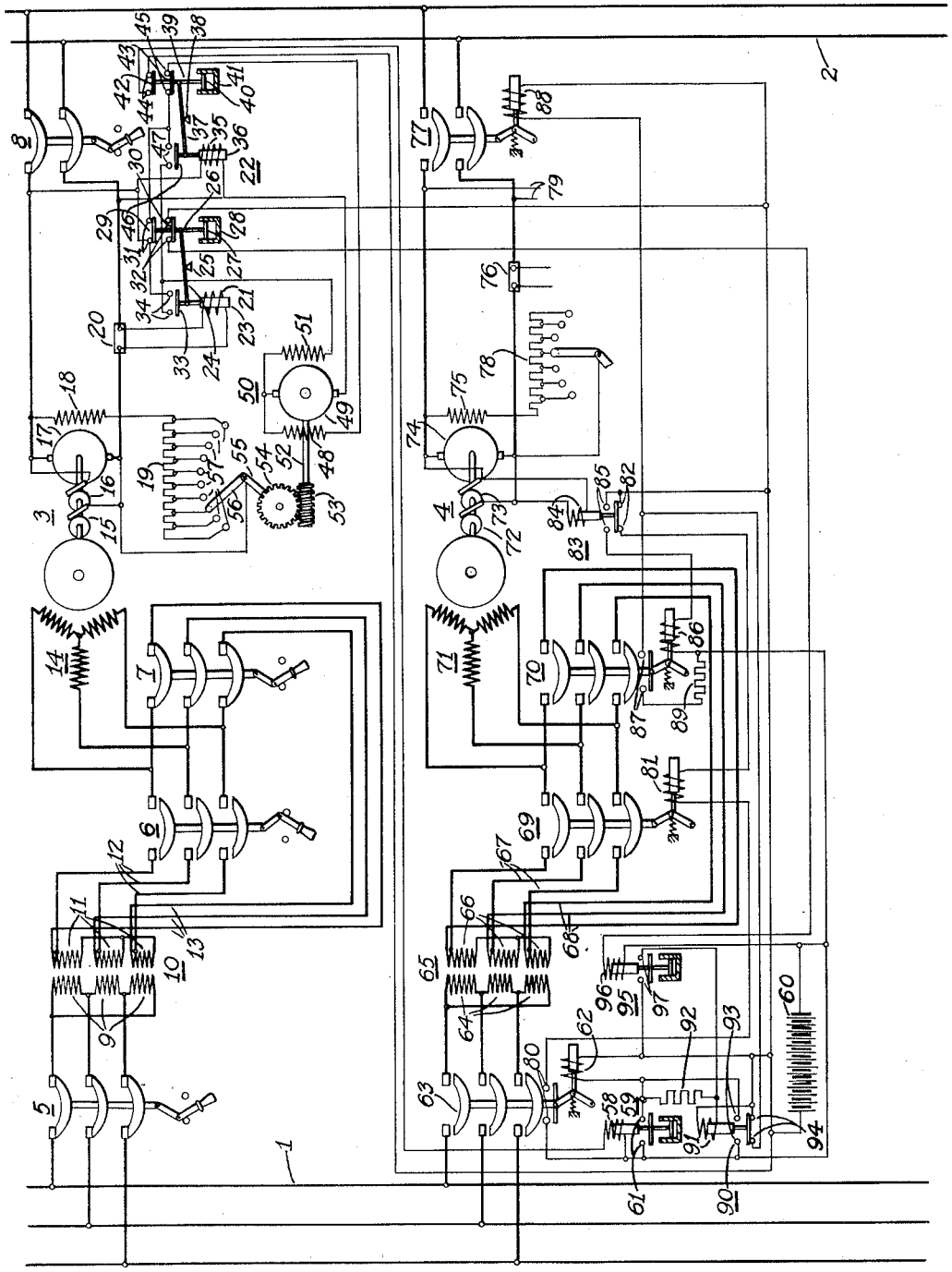
WITNESSES:
G. S. Neilson
A. H. Pendleton
INVENTOR
William L. Newmeyer
BY
Wesley G. Carr
ATTORNEY Patented May 3, 1927.

1,626,688

UNITED STATES PATENT OFFICE.

WILLIAM L. NEWMEYER, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC STATION.

Application filed February 18, 1924. Serial No. 693,574.

My invention relates to automatic stations and particularly to stations comprising a plurality of translating apparatus.

One object of my invention is to provide an automatic station comprising a plurality of translating apparatus and means for automatically starting additional apparatus when the power demand on the station exceeds a predetermined value.

Another object of my invention is to provide a station, of the above-indicated character, in which operation of certain of the apparatus shall be stopped when the power demand on the station is below a predetermined value.

Another object of my invention is to provide auxiliary means associated with a standard voltage regulator for accomplishing the above results.

A further object of my invention is to provide a station, of the above-indicated character, that shall be simple and economical to construct and reliable in its operation.

In practicing my invention, I provide an alternating-current supply circuit, a direct-current distribution circuit and a plurality of translating devices adapted to be connected therebetween. Each of the translating devices is provided with a voltage regulator on the side that is adapted to be connected to the distribution circuit. Each of these regulators comprises two balanced elements, one of which is provided with a current coil that is connected across a shunt in the direct-current circuit of the translating device and the other of which is provided with a voltage coil that is connected directly across the terminals of the direct-current circuit of the translating device.

So long as the current traversing this circuit is below a predetermined value, the current element of the regulator is ineffective and the voltage element co-operates with a motor-controlled rheostat that is connected in circuit with the field-magnet windings of the direct-current side of the translating device to maintain the voltage generated in the device at substantially a constant value.

When the current traversing the circuit exceeds a predetermined value, however, the current element of the regulator becomes effective and causes the voltage of the translating device to be reduced sufficiently to prevent the circuit from being traversed by current exceeding the predetermined value. The voltage element of the regulator is provided with a pair of auxiliary contact members that are engaged when this element of the regulator is in the condition corresponding to a voltage below normal. When these contact members have been engaged for a predetermined interval of time, co-operating means become effective to initiate the operation of another translating device in the station. In a similar manner, when the current element of the regulator remains in the condition corresponding to a load below normal for a predetermined interval of time, the co-operating means for controlling the next translating device become operative to stop the operation of that device.

The single figure of the accompanying drawing is a diagrammatic representation of an electrical system in which my invention is embodied.

Referring to the drawing, an alternating-current supply circuit 1 is adapted to supply energy to a direct-current distribution circuit 2 through translating devices 3 and 4. The translating device 3 is adapted to be manually connected between the two circuits 1 and 2 by means of circuit interrupters 5, 6, 7 and 8. The circuit interrupter 5, when closed, connects the primary windings 9 of a transformer 10 to the supply circuit 1. The transformer 10 is provided with secondary windings 11 that have starting taps 12 and running taps 13 that are adapted to be connected to the translating device 3. The starting taps 12 of the secondary windings 11 are connected to one side of the circuit interrupter 6, the other side of which is directly connected to stator windings 14 of the translating device 3. In similar manner, the running taps 13 are connected to one side of the circuit interrupter 7, the other side of which is connected to the stator windings 14.

The translating device 3, as shown in the drawing, comprises an alternating-current motor and a direct-current generator driven thereby. The motor comprises the stator windings 14 and a rotating field-magnet winding to which connection is made through slip rings 15 and 16. The direct-current generator comprises an armature member 17 and a field-magnet winding 18 that has a variable resistor 19 connected in series relation therewith across the terminals of the armature member 17. The terminals of the armature member 17 are connected through a shunt 20 and the circuit interrupter 8 to the distribution circuit 2 which is adapted to receive energy from the direct-current generator.

Across the shunt 20 a current coil 21 of a voltage regulator 22, is connected. This regulator is of a type shown in the co-pending application of C. A. Boddie, Serial No. 584,600, filed August 28, 1922, and assigned to the Westinghouse Electric & Manufacturing Company. The coil 21 is provided with a core member 23 that is connected to a lever arm 24 which, in turn, is supported by a fulcrum 25.

The other end of the lever arm 24 is connected to a vertical rod 26, the lower end of which is connected to a piston member 27 of a dash pot 28. The upper end of the rod 26 supports a pair of bridging members 29 and 30 that are adapted to engage contact members 31 and 32, respectively. The opposite end of the lever arm 24, which is connected to the core member 23, supports a bridging member 33 that is adapted to engage a pair of contact members 34.

The regulator 22 comprises a second element similar to the one just described, except that its coil 35 is a voltage coil that is connected across the direct-current circuit of the translating device 3. The core member 36 of the coil 35 is attached to a lever arm 37 that is supported by a fulcrum 38. The other end of the lever arm 37 is attached to a vertical rod 39, the lower end of which is attached to the piston 40 of a dash pot 41. The upper end of the rod 39 supports bridging members 42 and 43 that are adapted to engage contact members 44 and 45, respectively. The opposite end of the lever arm 37, that is connected to the core member 36, supports a bridging member 46 that is adapted to engage a pair of contact members 47.

The contact members 43 are connected in series relation with the contact members 29, the field-magnet winding 48 and the armature member 49, of a motor 50, across the direct-current circuit of the translating device 3. The contact members 47 are similarly connected in series relation with the contact members 29, the field-magnet winding 51 and the armature member 49 of the motor 50, across the same circuit.

The field-magnet windings 48 and 51 are so disposed with respect to the armature member 49 of the motor 50 that, when one of the field-magnet windings is energized, the armature member rotates in one direction, while, when the other field-magnet winding is energized, it rotates in the opposite direction. The armature member 49 is mounted on a shaft 52 that supports a worm 53.

The worm 53 engages a worm wheel 54 that is mounted on one end of a shaft 55, on the other end of which a contact-making arm 56 is mounted. The arm 56 is electrically connected to one terminal of the armature member 17 of the translating device 3 and is adapted to engage any one of a plurality of contact members 57 that are connected to various points on the variable resistor 19.

The contact members 44 of the regulator 22 are connected in series relation with an operating coil 58 of a time-delay relay 59 across the terminals of an electric battery 60. The relay 59 is provided with a pair of contact members 61 that are connected in series relation with a closing coil 62 of a circuit interrupter 63 to the battery 60.

One side of the circuit interrupter 63 is connected to the supply circuit 1 and the other side is connected to the primary windings 64 of a transformer 65. The transformer 65 is similar to the transformer 10 previously described. Its secondary windings 66 have starting taps 67 and running taps 68 that are adapted to be connected through circuit interrupters 69 and 70, respectively, to the stator windings 71 of the alternating-current end of the translating device 4.

The translating device 4 is similar to the device 3 in that it comprises stator windings 71 and a pair of slip rings 72 and 73 connected to a rotating field-magnet winding on its alternating-current end and an armature member 74 and a field-magnet winding 75 on its direct-current end. The terminals of the armature member 74 are connected through a shunt 76 and a circuit interrupter 77 to the distribution circuit 2. The direct-current end of the translating device 4 may be provided with a regulator similar to the regulator 22 provided for the translating device 3, but inasmuch as it is not a necessary part of my invention, it is not more fully shown in the diagram.

A variable resistor 78 corresponds to the resistor 19 shown for the translating device 3 and is similarly connected. The shunt 76 likewise corresponds to the shunt 20 and a pair of conductors 79 corresponds to the similar conductors shown for connecting the regulator 22 to the direct-current circuit of the translating device 3.

The circuit interrupter 63 is provided with a pair of contact members 80 that are connected in series relation with a closing coil 81 of the circuit interrupter 69 and a pair of contact members 82 of a voltage relay 83 to the battery 60. The voltage relay 83 has an operating coil 84 that is connected across the terminals of the armature member 74 of the direct-current end of the translating device 4. The contact members 82 are engaged when the relay 83 is in its de-energized condition, while a pair of contact members 85 of the same relay are engaged when the relay is energized. The contact members 85 are connected in series relation with a closing coil 86 of the circuit interrupter 70 to the battery 60.

A pair of auxiliary contact members 87 of the circuit interrupter 70, that are engaged when this circuit interrupter is closed, are connected in series relation with a closing coil 88 of the circuit interrupter 77 and a resistor 89 to the battery 60.

A relay 90 is provided with an operating coil 91 that is connected in series relation with a resistor 92 and the contact members 61 of the relay 59 to the battery 60. The relay 90 has a pair of contact members 93 that are engaged when the coil 91 is energized and that shunt the contact members 61. A second pair of contact members 94 of the relay 90 are engaged when the coil 91 is de-energized and shunt the closing coil 88 of the circuit interrupter 77.

A time-delay relay 95 is provided with an operating coil 96 that is connected in series relation with the contact members 32 of the regulator 22 to the battery 60. The relay 95 has a pair of contact members 97 that are engaged after the coil 96 has been energized for a predetermined interval of time, and that are connected to the terminals of the operating coil 91 of the relay 90.

Having described the apparatus and the circuits of the electrical system in which my invention is embodied, I shall now describe the operation of the system. Considering the translating device 3 to be so connected in circuit between the supply circuit 1 and the distribution circuit 2 as to translate energy therebetween, the circuit interrupters 5, 7 and 8 will be closed as shown in the diagram. Considering further that the current traversing the direct-current circuit of the translating device 3 is below the predetermined value that is permissible in this circuit, the current coil 21 of the regulator 22 will not be sufficiently energized to cause the bridging member 33 to engage the contact members 34, but will rather permit the bridging members 29 and 30 to remain in engagement with the contact members 31 and 32, respectively.

With the contact members 29 thus engaged, the motor 50 is directly controlled by the voltage element of the regulator 22 in such manner as to automatically adjust the amount of the variable resistance 19 that is connected in circuit with the field-magnet winding 18 to maintain the voltage across the terminals of the armature member 17 at substantially a constant value.

This operation is accomplished by the effect of the energization of the voltage coil 35 of the regulator 22 on its core member 36. When the voltage across the terminals of the armature member 17 is below the predetermined constant value that is desired, the energization of the coil 35 is insufficient to cause the bridging member 46 to engage the contact members 47 and contact members 44 and 45 will be engaged by the bridging members 42 and 43, respectively.

With the contact members 45 thus engaged, the field-magnet winding 48 and the armature member 49 of the motor 50 are connected across the direct-current circuit of the translating device 3 through the contact members 29 and 43. The field-magnet winding 48 of the motor 50 is so connected with respect to the armature member 49, that, when it is energized, the armature member 49 is caused to rotate in such direction as to turn the arm 56, through the shaft 52, worm 53, worm wheel 54 and shaft 55, in a clockwise direction.

The amount of the resistor 19 that is connected in circuit with the field-magnet winding 18 is thereby decreased and a current of greater magnitude is permitted to traverse the winding 18. The energization of the field-magnet winding of the direct-current end of the translating device 3 being thus increased, the voltage generated in the armature member 17 is likewise increased.

When the voltage of the direct-current circuit of the translating device 3 rises to the predetermined value that is desired, the energization of the voltage coil 35 of the regulator 22 is sufficient to cause the core member 36 to co-operate with the lever arm 37 to effect disengagement of the contact members 44 and 45 by the bridging members 42 and 43, respectively.

Energization of the field-magnet winding 48 and the armature member 49 of the motor 50 is precluded when the contact members 45 are disengaged and the contact-making arm 56 remains in the position to which it was actuated when the motor 50 was operating. The amount of the resistance 19 that is connected in circuit with the field-magnet winding 18 therefore remains unchanged until the voltage of the direct-current circuit of the translating device 3 varies sufficiently from the predetermined value that is desired to cause the regulator 22 to effect engagement of either the contact members 47 or 43.

If the voltage of the direct-current circuit materially exceeds the desired value, the energization of the coil 35 is sufficient to cause the core member 36 to actuate the bridging member 46 into engagement with the contact members 47. A circuit is thereby completed extending from the direct-current circuit of the translating device 3 through the contact members 29 and 47 to the field-magnet winding 51 and the armature member 49 of the motor 50.

The field-magnet winding 51 is so connected with respect to the armature member 49 that the motor 50 now causes the contact-making arm 56 to turn in a counter-clockwise direction to thereby increase the amount of the resistance 19 that is connected in circuit with the field-magnet winding 18. The energization of the field-magnet winding 18 is thereby decreased and the voltage generated in the armature member 17 is likewise decreased until it returns to the desired value.

Let us now suppose that the current traversing the direct-current circuit of the translating device 3 is in excess of the maximum desired value. The current coil 21 that is connected across the shunt 20 in the direct-current circuit is now sufficiently energized to cause the core member 23 to co-operate with the lever arm 24 to cause the bridging members 29 and 30 to disengage the contact members 31 and 32, respectively.

When the contact members 29 are disengaged, energization of the field-magnet winding 48 of the motor 50 is precluded and operation of the motor 50, in such direction as to turn the arm 56 in a clockwise direction, is precluded. Thus, when current traversing the shunt 20 in the direct-current circuit attains the predetermined maximum value, it is impossible for the amount of the resistance 19 that is connected in circuit with the field-magnet winding 18 to be decreased to thereby increase the voltage generated in the armature member 17.

If the current traversing the direct-current circuit of the translating device 3 continues to increase above the maximum desired value, the current coil 21 of the regulator 22 will be sufficiently energized to cause the core member 23 to actuate the bridging member 33 into engagement with the contact members 34.

The field-magnet winding 51 and the armature member 49 of the motor 50 are thereby connected to the direct-current circuit of the translating device 3 and the armature member 49 is caused to rotate in such a direction as to turn the arm 56 in a counter-clockwise direction. The amount of resistance 19 that is connected in circuit with the field-magnet winding 18 is thereby increased to cause the voltage that is generated in the armature member 17 of the translating device 3 to be decreased.

This operation continues until the voltage has been decreased to such a value that the current traversing the direct-current circuit no longer exceeds the maximum desired value. During the time that the voltage is being so reduced, the energization of the coil 35 of the regulator 22 is insufficient to maintain the bridging member 46 in engagement with the contact members 47 and the bridging members 42 and 43 are permitted to remain in engagement with the contact members 44 and 45, respectively.

When the contact members 44 are engaged by the bridging member 42, a circuit is completed between the battery 60 and the operating coil 58 of the time-delay relay 59. If the bridging member 42 remains in engagement with the contact member 44 for a predetermined interval of time, the relay 59 will cause the contact members 61 to be engaged, thereby completing a circuit extending from the battery 60 to the operating coil 91 of the relay 90, through the contact members 61 and the resistor 92.

The coil 91 is thus energized to cause the relay 90 to effect disengagement of the contact members 94 and engagement of the contact members 93. The contact members 93 so shunt the contact members 61 as to maintain energization of the coil 91 after the contact members 61 have become disengaged, and also to maintain energization of the closing coil 62, which is first energized to effect closing of the circuit interrupter 63 when the contact members 61 are engaged.

The auxiliary contact members 80 of the circuit interrupter 63 are engaged when this circuit interrupter is closed. The contact members 80 are connected in series relation with the closing coil 81 of the circuit interrupter 69, the contact members 82 of the voltage relay 83 and the battery 60. The coil 84 of the voltage relay 83 is connected across the terminals of the armature member 74 of the direct-current end of the translating device 4 and inasmuch as this device is not operating, there is no voltage across these terminals to energize the coil 84.

The contact members 82 are therefore permitted to remain engaged and when contact members 80 are engaged, the closing coil 81 of the circuit interrupter 69 is energized from the battery 60. Energization of the closing coil 81 causes the circuit interrupter 69 to be closed to connect the stator windings 71 of the alternating-current end of the translating device 4 to the starting taps 67 of the secondary winding 66 of the transformer 65.

The alternating current motor of the translating device 4 is thus started as an induction motor and its speed gradually increases. As the speed of the translating device 4 increases, the voltage generated in the armature member 74 builds up, the field-magnet windings of the alternating-current motor being directly energized from the armature member 74, and the field-magnet winding 75 of the direct-current generator being also energized from the armature member 74 but through part of the resistor 78.

When the voltage between the terminals of the armature member 74 attains a predetermined value, the energization of the coil 84 of the voltage relay 83 is sufficient to cause this relay to effect disengagement of the contact members 82 and engagement of the contact members 85.

When the contact members 82 of the relay 83 are disengaged, the circuit extending through the closing coil 81 of the circuit interrupter 69 is interrupted and this circuit interrupter is permitted to open to disconnect the stator windings 71 from the starting taps 67. Engagement of the contact members 85 completes a circuit extending from the battery 60 to the closing coil 86 of the circuit interrupter 70 and this interrupter is thereby closed to connect the stator windings 71 to the running taps 68 of the transformer secondary winding 66.

When the running interrupter 70 is closed, the alternating-current end of the translating device 4 is running on full voltage and is ready to assume a load. The auxiliary contact members 87 of the circuit interrupter 70, which are engaged when the circuit interrupter is closed, are connected in series relation to the battery 60, the resistor 89 and the closing coil 88 of the circuit interrupter 77. Therefore, as soon as the contact members 87 are engaged, the coil 88 is energized from the battery 60 and the circuit interrupter 77 is closed. The direct-current end of the translating device 4 is thereby connected to the distribution circuit 2 and assumes a part of the power demand thereon to relieve the overload on the translating device 3.

When the translating device 3 is relieved of its overload, the current element of the regulator 22 returns to its normal condition and the voltage generated in the armature member 17 is again brought under the control of the voltage element of the regulator 22. In a similar manner, the translating device 4 may be considered to be under the control of a regulator similar to the regulator 22, but not shown in the diagram.

If the current element of the regulator 22 remains in its normal position for a predetermined interval of time, the contact members 32 will have been engaged by the bridging member 30 for a sufficient length of time to cause the time-delay relay 95 to effect engagement of its contact members 97, since engagement of the contact members 32 completes a circuit extending from the battery 60 to the operating coil 96 of the relay 95. The interval of time required for the operation of the relay 95 may be of any desired value, depending upon the character of service for which the station is to be utilized, etc.

The contact members 97 of the relay 95 are so connected across the terminals of the operating coil 91 of the relay 90 that, when they are engaged, this coil is short-circuited and therefore de-energized. When this condition occurs, the relay 90 returns to its de-energized condition in which the contact members 93 are disengaged and the contact members 94 are engaged.

Disengagement of the contact members 93 interrupts the circuit extending through the closing coil 62 of the circuit interrupter 63 to thereby permit the circuit interrupter 63 to open. The primary windings 64 of the transformer 65 are thereby disconnected from the supply circuit 1 and the translating device 4 can no longer receive energy from the circuit 1.

The contact members 94 are so connected across the terminals of the closing coil 88 of the circuit interrupter 77 that when they are engaged the coil 88 is short-circuited and the circuit interrupter 77 is permitted to open to disconnect the direct-current end of the translating device 4 from the distribution circuit 2. In like manner, all of the other controlling means of the translating device 4 are de-energized with the exception of the operating coil 96 of the time-delay relay 95. The translating device 4 is now disconnected from both the supply circuit 1 and the distribution circuit 2 and the total load is again thrown upon the translating device 3.

All of the apparatus in the translating station is now in the same condition as that in which it was first considered and is ready to go through the same cycle of operations. I have explained how the operation of the second translating device 4 is initiated and how it is connected between the supply circuit 1 and the distribution circuit 2 in response to predetermined conditions existing in the controlling means of the first translating device 3.

It is obvious that the translating device 4 may be provided with a system of controlling means similar to that shown and described for the device 3. This would make it possible for the operation of still another translating device to be initiated and for the device to be connected in circuit in response to predetermined conditions in the device 4. In this manner, an indefinite number of translating devices may be provided with means for causing a predetermined set of conditions existing in one device, or the controlling means thereof, to effect starting and connection between the circuits 1 and 2 of another device.

It will be understood that the system embodying my invention is not limited to the specific details of construction and connections that have been described in the foregoing specification, as many changes and modifications may be made therein without departing from the spirit and scope of my invention, as set forth in the appended claims.

I claim as my invention:

1. An automatic electrical translating station comprising a plurality of translating devices, a common circuit for receiving energy therefrom, regulating means for automatically regulating the voltage of each of the translating devices, and means actuated by the regulating means of one device for determining the periods of operation of another device.

2. An automatic electrical translating station comprising a plurality of translating devices, a common circuit for receiving energy therefrom, regulating means for automatically regulating the voltage of each of the translating devices, and means associated with the regulating means of an operating translating device for effecting the initiation of operation of a translating device that is not operating, under predetermined conditions.

3. An automatic electrical translating station comprising a plurality of translating devices, a common circuit for receiving energy therefrom, regulating means for automatically regulating the voltage of each of the translating devices, and means associated with the regulating means of an operating translating device for causing the operation of another operating translating device to be stopped under predetermined conditions.

4. An automatic electrical translating station comprising a plurality of translating devices, a common circuit for receiving energy therefrom, regulating means for automatically regulating the voltage of each of the translating devices, and means associated with the regulating means of an operating translating device for effecting the initiation of operation of a translating device that is not operating, when the device or devices already operating are loaded in excess of a predetermined degree for a predetermined interval of time.

5. An automatic electrical translating station comprising a plurality of translating devices, a common circuit for receiving energy therefrom, regulating means for automatically regulating the voltage of each of the translating devices, and means associated with the regulating means of an operating translating device for causing the operation of another operating translating device to be stopped when the operating devices are loaded below a predetermined degree for a predetermined interval of time.

6. The combination with a plurality of electrical translating devices, a common circuit for receiving energy therefrom, and automatic regulating means for causing the voltage of each of the translating devices to be maintained at substantially a constant predetermined value so long as the current traversing the device is below a predetermined value and for causing the voltage of each device that is traversed by a current exceeding this value to be reduced sufficiently to reduce the current to and maintain it at this value, of auxiliary means associated with the regulating means of one device for controlling the operation of another device.

7. The combination with a plurality of electrical translating devices, a common circuit for receiving energy therefrom, and automatic regulating means for causing the voltage of each of the translating devices to be maintained at substantially a constant predetermined value so long as the current traversing the devices is below a predetermined value and for causing the voltage of each device that is traversed by a current exceeding this value to be reduced sufficiently to reduce the current to, and maintain it at, this value, of auxiliary means associated with the regulating means of an operating device for effecting the initiation of operation of a translating device that is not operating, under predetermined conditions.

8. The combination with a plurality of electrical translating devices, a common circuit for receiving energy therefrom, and automatic regulating means for causing the voltage of each of the translating devices to be maintained at substantially a constant predetermined value so long as the current traversing the devices is below a predetermined value and for causing the voltage of each device that is traversed by a current exceeding this value to be reduced sufficiently to reduce the current to, and maintain it at, this value, of auxiliary means associated with the regulating means of an operating device for causing the operation of another operating translating device to be stopped under predetermined conditions.

9. The combination with a plurality of electrical translating devices, a common circuit for receiving energy therefrom, and automatic regulating means for causing the voltage of each of the translating devices to be maintained at substantially a constant predetermined value so long as the current traversing the devices is below a predetermined value and for causing the voltage of each device that is traversed by a current exceeding this value to be reduced sufficiently to reduce the current to, and maintain it at, this value, of auxiliary means associated with the regulating means of an operating device for effecting the initiation of operation of a translating device that is not operating when the device or devices already operating are loaded in excess of a predetermined degree for a predetermined interval of time.

10. The combination with a plurality of electrical translating devices, a common circuit for receiving energy therefrom, and automatic regulating means for causing the voltage of each of the translating devices to be maintained at substantially a constant predetermined value so long as the current traversing the devices is below a predetermined value and for causing the voltage of each device that is traversed by current exceeding this value to be reduced sufficiently to reduce the current to, and maintain it at, this value, of auxiliary means associated with the regulating means of an operating device for causing the operation of another operating translating device to be stopped when the operating devices are loaded below a predetermined degree for a predetermined interval of time.

11. The combination with a plurality of electric generators, driving means therefor, a common circuit for receiving energy from the generators and an automatic regulator associated with each generator, comprising a voltage element for causing the voltage of the generator associated therewith to be maintained at substantially a constant predetermined value so long as the current traversing the generator is below a predetermined value and a current element for preventing the generator from being traversed by a current exceeding this value by causing the voltage of the generator to be reduced sufficiently to permit only the predetermined value of current to traverse the generator, of auxiliary means associated with the regulator of one generator for controlling the operation of another generator.

12. The combination with a plurality of electric generators, driving means therefor, a common circuit for receiving energy from the generators, and an automatic regulator associated with each generator, comprising a voltage element for causing the voltage of the generator associated therewith to be maintained at substantially a constant predetermined value so long as the current traversing the generator is below a predetermined value and a current element for preventing the generator from being traversed by current exceeding this value by causing the voltage of the generator to be reduced sufficiently to permit only the predetermined value of current to traverse the generator, of auxiliary means associated with the regulator of an operating generator for effecting the initiation of operation of a generator that is not operating, under predetermined conditions.

13. The combination with a plurality of electric generators, driving means therefor, a common circuit for receiving energy from the generators, and an automatic regulator associated with each generator, comprising a voltage element for causing the voltage of the generator associated therewith to be maintained at substantially a constant predetermined value so long as the current traversing the generator is below a predetermined value and a current element for preventing the generator from being traversed by current exceeding this value by causing the voltage of the generator to be reduced sufficiently to permit only the predetermined value of current to traverse the generator, of auxiliary means associated with the regulator of an operating generator for causing the operation of another operating generator to be stopped under predetermined conditions.

14. The combination with a plurality of electric generators, driving means therefor, a common circuit for receiving energy from the generators, and an automatic regulator associated with each generator, comprising a voltage element for causing the voltage of the generator associated therewith to be maintained at substantially a constant predetermined value so long as the current traversing the generator is below a predetermined value and a current element for preventing the generator from being traversed by current exceeding this value by causing the voltage of the generator to be reduced sufficiently to permit only the predetermined value of current to traverse the generator, of auxiliary means associated with the regulator of an operating generator for effecting the initiation of operation of a generator that is not operating when the generator or generators already operating are loaded in excess of a predetermined degree for a predetermined interval of time.

15. The combination with a plurality of electric generators, driving means therefor, a common circuit for receiving energy from the generators, and an automatic regulator associated with each generator, comprising a voltage element for causing the voltage of the generator associated therewith to be maintained at substantially a constant predetermined value so long as the current traversing the generator is below a predetermined value and a current element for preventing the generator from being traversed by current exceeding this value by causing the voltage of the generator to be reduced sufficiently to permit only the predetermined value of current to traverse the generator, of auxiliary means associated with the regulator of an operating generator for causing the operation of another operating generator to be stopped when the operating generators are loaded below a predetermined degree for a predetermined interval of time.

In testimony whereof, I have hereunto subscribed my name this 15th day of February, 1924.

WILLIAM L. NEWMEYER.